United States Patent [19]

Darden

[11] Patent Number: 4,561,990
[45] Date of Patent: Dec. 31, 1985

[54] HIGH LEAD SOLDER CORROSION INHIBITORS

[75] Inventor: Jerome W. Darden, Austin, Tex.

[73] Assignee: Texaco Inc., White Plains, N.Y.

[21] Appl. No.: 657,564

[22] Filed: Oct. 4, 1984

[51] Int. Cl.$^4$ .............................................. C09K 5/00
[52] U.S. Cl. ..................................... 252/75; 252/74; 252/76; 252/79; 252/389
[58] Field of Search .................. 252/74, 75, 76, 79, 252/389.54

[56] References Cited

U.S. PATENT DOCUMENTS

| | | | |
|---|---|---|---|
| 2,147,395 | 6/1937 | Bayes | 252/5 |
| 2,147,409 | 6/1937 | Lamprey | 252/5 |
| 2,726,215 | 12/1955 | Jones | 252/389 |
| 3,931,029 | 1/1976 | Dutton et al. | 252/76 |
| 4,382,008 | 5/1983 | Boreland et al. | 252/75 |
| 4,402,847 | 9/1983 | Wilson et al. | 252/75 |
| 4,452,715 | 6/1984 | Hirozawa | 252/75 |

FOREIGN PATENT DOCUMENTS

| | | |
|---|---|---|
| 0077767 | 9/1982 | European Pat. Off. . |
| 2489355 | 5/1982 | France . |

OTHER PUBLICATIONS

Vukasovich et al., "Evaluation of Molybdate as an Inhibitor in Automotive Engine Coolants", Mater. Perform. 1983, 22(8), 25–33.

Chemical Abstract 99:126713x, 1983 of Japanese Kokai 58-27,926.

M. S. Vukasovich, "Sodium Molybdate Corrosion Inhibition of Synthetic Metal Working Fluids", *Lubrication Engineering*, vol. 36, No. 12, Dec. 1980, pp. 708–712.

M. S. Vukasovich, "Rust Protection of Synthetic Metalworking Fluids with Nitrite Alternatives", *Lubrication Engineering*, vol. 40, No. 8, Aug. 1984, pp. 456–462.

G. Butler, et al., "Inhibitor Formulations for Engine Coolants", *British Corrosion Journal*, 1977, vol. 12, No. 3, pp. 171–174.

*Primary Examiner*—Paul Lieberman
*Assistant Examiner*—Robert A. Wax
*Attorney, Agent, or Firm*—Jack H. Park; Kenneth R. Priem; Richard A. Morgan

[57] ABSTRACT

The use of dicarboxylic acids or the salts thereof in aqueous solutions to prevent the corrosion of high lead solders contacted thereby is described. These materials are particularly useful in phosphate-based antifreezes. Particularly preferred is the combination of a dicarboxylic acid and an alkali metal molybdate. This mixture gives greater corrosion protection to high lead solder than either component alone.

6 Claims, No Drawings

HIGH LEAD SOLDER CORROSION INHIBITORS

BACKGROUND OF THE INVENTION

1. Field of the Invention

The invention relates to corrosion-inhibited aqueous solutions and particularly relates to corrosion-inhibited antifreeze compositions containing dicarboxylic acids useful as coolants in a heat exchange system such as the cooling system of an internal combustion engine.

2. Other Inhibitors Known in the Art

It is well known to use dicarboxylic acids as corrosion inhibitors in aqueous systems. For example, Jones in U.S. Pat. No. 2,726,215 teaches that dicarboxylic acids; namely, sebacic acid and azelaic acid, and their alkali and alkali metal salts are useful corrosion inhibitors in aqueous solutions. The use of a mixture of sodium sebacate (sodium salt of sebacic acid) and benzotriazole was disclosed as a useful corrosion inhibitor in engine coolants by G. Butler, et al. in "Inhibitor Formulations for Engine Coolants," *British Corrosion Journal*, Vol. 12, No. 3, 1977, pp 171–174.

U.S. Pat. No. 3,931,029 to Dutton, et al. teaches the use of certain unsaturated cycloalkylene dicarboxylic acids as antifreeze additives to inhibit corrosion of contacted solder alloys. Corrosion inhibitors containing an imidazoline derivative, a carboxylic acid or its metal salt and/or a phosphate are used for steel in brackish or acidic water according to *Chemical Abstracts*, Vol. 99, paragraph 126713x, 1983, which describes Japanese Kokai No. 58-84, 981. U.S. Pat. No. 4,382,008 reveals a corrosion-inhibited antifreeze containing a triazole, an alkali metal borate, an alkali metal benzoate, an alkali metal silicate and an alkali metal salt of a $C_7$ to $C_{13}$ dibasic organic acid. The use of sodium sebacate as a corrosion inhibitor in phosphatebased antifreezes is further seen in the Derwent Abstract of Week E14 for French Certificate of Utility No. 2,489,355 to Perrot.

The Derwent Abstract of Week K18 for European Patent No. 77,767-B teaches the use of water-soluble salts of dicarboxylic acids having at least three carbon atoms as antifreeze corrosion inhibitors. These acids are malonic, succinic, glutaric and adipic acids along with smaller proportions of $C_8$ and/or $C_{10}$ dicarboxylic acids. A mixture of a siloxane-silicate copolymer with an azole was found effective in reducing the corrosion of high-lead solder and aluminum in aqueous liquids according to U.S. Pat. No. 4,402,847 to Wilson, et al. U.S. Pat. No. 4,414,126 also to Wilson involves the use of alkali metal mercaptobenzothiazoles as effective inhibitors for the corrosion of high lead solder in aqueous systems.

Molybdates are also known corrosion inhibitors; see, for example, U.S. Pat. No. 2,147,395 to Bayes and U.S. Pat. No. 2,147,409 to Lamprey. Sodium molybdate is even known to inhibit corrosion synergistically with other additives such as sodium nitrite, amine borate, carboxylate, ethanolamine borate esters, fatty acid alkanolamides, sarcosinates, phosphates and phosphate esters. For examples, see M. S. Vukasovich, "Sodium Molybdate Corrosion Inhibition of Synthetic Metalworking Fluids," *Lubrication Engineering*, Vol. 36, No. 12, Dec. 1980, pp. 708–712 and M. S. Vukasovich, Rust Protection of Synthethic Metalworking Fluids with Nitrite Alternatives," *Lubrication Engineering*, Vol. 40, No. 8, Aug. 1984, pp. 456–462. The carboxylic acid salts used in the studies described by these articles are believed to be derived from monocarboxylic acids due to the prices for the commercial materials quoted in the articles and because they are not specified as dicarboyxlic acid salts. In addition, aluminum corrosion is permitted by these materials which is characteristic of monobasic acids rather than dibasic acids. As will be demonstrated, the carboxylic acid used should be dibasic rather than monobasic since the combination of the monobasic acid with sodium molybdate allowed excessive corrosion of brass.

There remains a need for the discovery of highly effective corrosion inhibitors for aqueous solutions, particularly those which come into contact with high lead solder, particularly in phosphate-based solutions.

SUMMARY OF THE INVENTION

The invention concerns a corrosion-preventing mixture made up of a dicarboxylic acid or an alkali metal salt of a dicarboxylic acid with an alkali metal molybdate.

DETAILED DESCRIPTION OF THE PREFERRED EMBODIMENTS

Solder with a higher lead content is being used more frequently in automotive cooling systems because of its lower cost and the energy savings it provides. However, it corrodes easily, especially in high pH antifreeze formulations. The corrosion seems to be accelerated by the phosphate ion. One such solder is Modine solder which contains 97% lead, 2.5% tin and 0.5% silver.

It has been discovered that dicarboxylic acids serve as corrosion inhibitors in phosphate-based antifreeze. For example, levels of 0.1 to 1.0 wt.% of sebacic acid in an antifreeze formulation are seem to be effective. The acid may be used in combination with other more conventional corrosion inhibitors such as nitrates, slicates and azoles. An especially preferred embodiment involves the use of a mixture of a dibasic acid and an alkali metal molybdate, which unexpectedly gives synergistic corrosion inhibiting results.

The dicarboxylic acid component may be any dicarboxylic acid or an alkali metal salt of dicarboxylic acid. Alkali earth metal salts of dicarboxylic acids may also be useful. Preferably, the dicarboxylic acids should have from 8 to 12 carbon atoms, inclusive. This would include suberic (octanedioic), azelaic (nonanedioic), sebacic (decanedioic), undecanedioic and dodecanedioic acids and mixtures thereof. Sebacic acid is particularly preferred. Any alkali metal could be used to make the salt described, for example, lithium, sodium, potassium, rubidium, and cesium, although sodium and potassium are preferred.

The molybdate corrosion inhibitor should be an alkali metal molybdate. The preferred alkali metals are again sodium and potassium. Sodium molybdate is especially preferred.

It has been surprisingly discovered that the combination of a dicarboxylic acid component and an alkali metal molybdate performs better as a corrosion inhibitor than either one individually. Preferably, the weight ratio of dicarboxylic acid to alkali metal molybdate is at least 1.2:1 with an upper limit to be determined by the formulator in accordance with economic and effectiveness constraints. It is especially preferred that the weight ratio of dicarboxylic acid component to alkali metal molybdate be from 2:1 to 3:1.

Typically, this mixture is used as a corrosion inhibitor in antifreeze formulations. The antifreeze formulations most commonly used include mixtures of water and glycols and glycol ethers. The glycols and glycol ethers which can be employed as major components in the present composition include glycols such as ethylene glycol, diethylene glycol, propylene glycol, and dipropylene glycol, and glycol monoethers such as the methyl, ethyl, propyl and butyl ether of ethylene glycol, diethylene glycol, propylene glycol and dipropylene glycol. Also useful are glycol diethers such as methyl and ethyl diethers of ethylene glycol, diethylene glycol and dipropylene glycol. Ethylene glycol is particularly preferred as the major antifreeze component.

A number of known corrosion inhibitors and additives can be used in the present invention. Some corrosion inhibitors are the alkali metal silicates, such as sodium metasilicate, potassium metasilicate and lithium metasilicate. Also useful are the silicates represented by the formuls

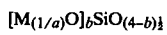

where M is a cation that forms a water-soluble silicate, a is the valence of the cation represented by M and b has a value from 1 to 3, inclusive. See U.S. Pat. Nos. 3,337,496 and 3,312,622.

Other corrosion inhibitors and additives may be used such as alkali metal borates which include sodium tetraborate, potassium tetraborate, sodium metaborate and potassium metaborate. Other permissible components include alkali metal nitrates, such as sodium nitrate and potassium nitrate, azoles such as alkali metal mercaptothiazoles and alkali metal tolyltriazoles, alkali metal nitrites such as potassium nitrite and sodium nitrite, alkali metal phosphates such as sodium phosphate and potassium phosphate, alkali metal benzoates and various antifoaming agents and dyes, if desired. It is particularly surprising that the corrosion inhibitor of this invention works well in the presence of phosphates given that the phosphate ion is thought to contribute to the corrosion of high lead solder.

The amounts of these corrosion inhibitors known to be effective are well known in the art. Of course, the amount will vary for each inhibitor. It is not possible to set forth exactly the amount of the corrosion-preventing mixture of this invention to be used in each instance due to the complicating influence of the other corrosion inhibitors such as the aforementioned borates, triazoles, nitrates, nitrites and phosphates. Simple, accelerated aging tests can be used to determine the amount of silicate which when added will give the desired corrosion resistance. Generally, the corrosion-preventing mixture of this invention, whether it is the dicarboxylic acid component alone or the dicarboxylic acid component/alkali metal molybdate mixture, should range from about 0.1 to 1.1 wt%. based on the glycol or glycol ether component only and from about 0.1 to 1.0 wt.% based on the total antifreeze composition (including water and additives).

The corrosion-inhibiting additive of this invention is particularly useful in preventing corrosion in solder consisting of blends having equal to or greater than 90% lead. Unexpectedly, it was found that the use of both an alkali metal molybdate (like $Na_2MoO_4$) and dibasic acids in certain combinations gives a synergistic combination; that is, the use of both prevents corrosion of high lead solder more effectively than does the use of the same amount of each component by itself. The pH of the resulting antifreeze should range from about 7 to 12. The advantage of the phosphate-based antifreeze is the extra buffering capability. Note the reserve alkalinity in the examples below.

The invention will be further illustrated by the following examples which are not intended to limit the invention, but rather to illuminate it.

EXAMPLE 1

An antifreeze formulation containing ethylene glycol, alkali metal hydroxides, $NaNO_3$, $Na_2SiO_3.5H_2O$, tolyltriazole, phosphoric acid, and 0.10 wt% sebacic acid was prepared. The pH of the sample (50% aqueous) was 10.2 and the 10 ml reserve alkalinity was 15.5.

EXAMPLE 2

The antifreeze formulation prepared in Example 1 was used in the Texaco Modified ASTM D-1384 Glassware Corrosion Test. This test calls for the use of 25% antifreeze in corrosive water rather than the 33-⅓ concentration called for in ASTM D-1384. The lower antifreeze concentration makes the test more severe. Results of this experiment are given in Table I.

EXAMPLE 3

The same antifreeze used in Example 1 was prepared, except that 0.30 wt.% of sebacic acid was added. The pH of a 50% aqueous solution of the sample was 10.2. The sample was run in the Texaco Modified ASTM D-1384 Glassware Test; results are given in Table I.

EXAMPLE 4

The same antifreeze used in Example 1 was prepared, except that 0.50 wt.% of sebacic acid was added. The pH of a 50% aqueous solution of the sample was 10.1. The sample was run in the Texaco Modified ASTM D-1384 Glassware Test; results are given in Table I.

EXAMPLE 5

An antifreeze formulation containing ethylene glycol, alkali metal hydroxides, $NaNO_3$, $Na_2SiO_3.5H_2O$, tolyltriazole and phosphoric acid was prepared. The pH of a 50% aqueous solution of the sample was 10.6. The sample was run in the Texaco modified ASTM D-1384 Glassware test; results are given in Table I.

EXAMPLE 6

The same antifreeze fomulation prepared in Example 5 was prepared. The pH of a 50% aqueous solution of the sample was 10.9. The sample was run in the Texaco modified ASTM D-1384 Glassware Test; results are given in Table I.

TABLE I

| | Weight Loss, mg/coupon | | | | | | |
|---|---|---|---|---|---|---|---|
| | Cu | Modine Solder* | Brass | 70/30 Solder | Steel | Fe | Al |
| Example 2 | 2 | 61 | 3 | 3 | −0.1 gain | 6 | −7.7 gain |
| Example 3 | 4 | 60 | 2 | 1 | 1 | 4 | −1.6 gain |
| Example 4 | 1 | 43 | 1 | 0 | −0.1 gain | 4 | −6.9 gain |
| Example 5 | 3 | 85 | 1 | 4 | 1 | 8 | 2 |
| Example 6 | 2 | 117 | 2 | 0 | 1 | 3 | −2 gain |
| ASTM spec, maximum | 10 | — | 10 | 30 | 10 | 10 | 30 |

*97% Pb, 2.5% Sn, 0.5% Ag

As can be seen from Table I, the use of sebacic acid (Examples 2-4) reduces the corrosion of Modine solder when compared with more conventional formulations (Examples 5-6). The formulations containing sebacic acid lose none of the advantage of aluminum protection given by the more conventional formulations in the past. The changes in weight loss for Modine solder are given in Table II.

TABLE II

| | Reduction in Corrosion, Modine Solder, wt. %/coupon | |
|---|---|---|
| | Over Example 5 | Over Example 6 |
| Example 2 | 28 | 48 |
| Example 3 | 29 | 49 |
| Example 4 | 49 | 63 |

EXAMPLE 7

An antifreeze blend with the following additive composition was prepared:

| | Wt. % |
|---|---|
| KOH, 45% aq | 1.5 |
| NaOH, 50% aq. | 1.2 |
| $NaNO_3$ | 0.2 |
| $Na_2SiO_3.5H_2O$ | 0.3 |
| Tolyltriazole | 0.2 |
| $H_3PO_4$, 75% aq. | 1.5 |
| Sebacic acid | 0.2 |
| $Na_2MoO_4.2H_2O$ | 0.1 |

The 50% aqueous pH of this antifreeze was 10.8, and the 10 ml reserve alkalinity was 18.2. The sample was tested in The ASTM D-1384 Glassware Test. Results are given in Table III.

EXAMPLE 8

An antifreeze containing 0.3% $Na_2MoO_4.2H_2O$ was prepared. This antifreeze was otherwise identical to the one prepared in Example 5. No carboxylic acid was present. The sample was tested in the ASTM Glassware Test and the results are given in Table III.

TABLE III

| | ASTM GLASSWARE TEST RESULTS | | | | | | |
|---|---|---|---|---|---|---|---|
| | Cu | Modine Solder | Brass | 70/30 Solder | Steel | Fe | Al |
| Example 7 | 3 | 12 | 6 | −2 gain | −1 gain | −2 gain | −7 gain |
| Example 5 | 3 | 85 | 1 | 4 | 1 | 8 | 2 |
| Example 3 | 4 | 60 | 2 | 1 | 1 | 4 | −2 gain |
| Example 8 | 3 | 58 | 6 | 2 | −1 gain | −1 gain | −3 gain |

These examples show that the compositions of this invention are clearly superior to the other formulations. The formulations of Example 5 contain no additive to prevent the corrosion of high lead Modine solder. The composition of Example 3 contains sebacic acid alone. Although Modine solder corrosion is reduced, this composition is clearly inferior to the formulations of this invention, shown in Example 7. The same may be said of the composition of Example 8, which contains only $Na_2MoO_4.2H_2O$ when these are used alone.

EXAMPLES 9 and 10

These examples will demonstrate that the carboxylic acid salt employed should be a dicarboxylic acid rather than a monocarboxylic acid. Example 9 was identical to Example 7 except that the corrosion inhibitors sebacic acid and $Na_2MoO_4.2H_2O$ were not used, being replaced by 0.3 wt.% neodecanoic acid, a monoacid having ten carbon atoms. Example 10 was identical to these two formulations except that the corrosion inhibitors were 0.2 wt.% neodecanoic acid and 0.1 wt.% $Na_2MoO_4.2H_2O$ instead of those mentioned previously. Samples were tested in the ASTM Glassware Test used in Table III and the results are presented in Table IV.

TABLE IV

| | ASTM D-1384 GLASSWARE TEST RESULTS | | | | | | |
|---|---|---|---|---|---|---|---|
| | Weight Loss, $mg/cm^2$ coupon | | | | | | |
| | Cu | Modine Solder | Brass | 70/30 Solder | Steel | Fe | Al |
| Example 9 | 3 | 52 | 8 | 1 | 1 | 1 | 3 |
| Example 3 | 4 | 60 | 2 | 1 | 1 | 4 | −2 gain |
| Example 10 | 6 | 32 | 11 | 0 | 0 | −1 gain | 0 |
| Example 7 | 3 | 12 | 6 | −2 gain | −1 gain | −2 gain | −7 gain |
| Example 5 | 3 | 85 | 1 | 4 | 1 | 8 | 2 |
| Example 8 | 3 | 58 | 6 | 2 | −1 gain | −1 gain | −3 gain |
| ASTM spec, maximum | 10 | — | 10 | 30 | 10 | 10 | 30 |

It should be noted that the $C_{10}$ mono acid (neodecanoic) in Example 9 did reduce Modine solder corrosion by an amount comparable to the reduction caused by the $C_{10}$ diacid sebacic) in Example 3. Further, the combination of the $C_{10}$ monoacid (neodecanoic) and the molybdate reduced Modine solder corrosion more than the monoacid or sodium molybdate alone.

However, Modine solder corrosion was reduced far less by the combination of the $C_{10}$ monoacid (neodecanoic) and sodium molybdate in Example 10 (32) than by the $C_{10}$ diacid (sebacic)/sodium moylbdate combination of Example 7 (12). Also, the use of the $C_{10}$ monoacid increased brass corrosion in this antifreeze. In fact, when the $C_{10}$ monoacid is combined with the molybdate, the weight loss observed for brass is unacceptable (11 versus 10 $mg/cm^2$). The dicarboxylic acids of this invention do not increase brass corrosion. Thus, the monocarboxylic acids believed to be used in the Vukasovich articles mentioned earlier would be unacceptable in antifreeze formulations.

The compositions of this invention may be further modified by one skilled in the art without departing from the spirit and scope of this invention, which are defined only in the appended claims. For example, a particular combination of dicarboxylic acid or salt thereof and molybdenum-containing compound may prove to be particularly advantageous.

I claim:

1. A corrosion-preventing mixture comprising
   a. a dicarboxylic acid component selected from the group consisting of at least one dicarboxylic acid comprising 8 to 12 carbon atoms and at least one alkali metal salt of a dicarboxylic acid comprising 8 to 12 carbon atoms and
   b. at least one alkali metal molybdate in a weight ratio of dicarboxylic acid component to alkali metal molybdate of about 2:1.

2. The corrosion-preventing mixture of claim 1 in which the dicarboxylic acid component is sebacic acid and the alkali metal molybdate is sodium molybdate.

3. A corrosion-protected antifreeze composition comprising
   a. a glycol component selected from the group consisting of an alkylene glycol, an alkylene glycol ether and mixtures thereof, and
   b. a corrosion-preventing mixture comprising
      (1) a dicarboxylic acid component selected from the group consisting of at least one dicarboxylic acid comprising 8 to 12 carbon atoms and at least one alkali metal salt of a dicarboxylic acid comprising 8 to 12 carbon atoms, and
      (2) at least one alkali metal molybdate in a weight ratio of dicarboxylic acid component to alkali metal molybdate of about 2:1.

4. The antifreeze composition of claim 3 in which the glycol component is ethylene glycol.

5. The antifreeze composition of claim 3 in which the corrosion-preventing mixture is present in a proportion ranging from about 0.1 to 1.1 wt.% based on the glycol component.

6. The antifreeze composition of claim 3 in which the dicarboxylic acid component is sebacic acid and the alkali metal molybdate is sodium molybdate.

* * * * *